March 27, 1956 W. J. CONERY 2,740,059
SUBMERSIBLE MOTOR
Filed Aug. 13, 1952 3 Sheets-Sheet 1
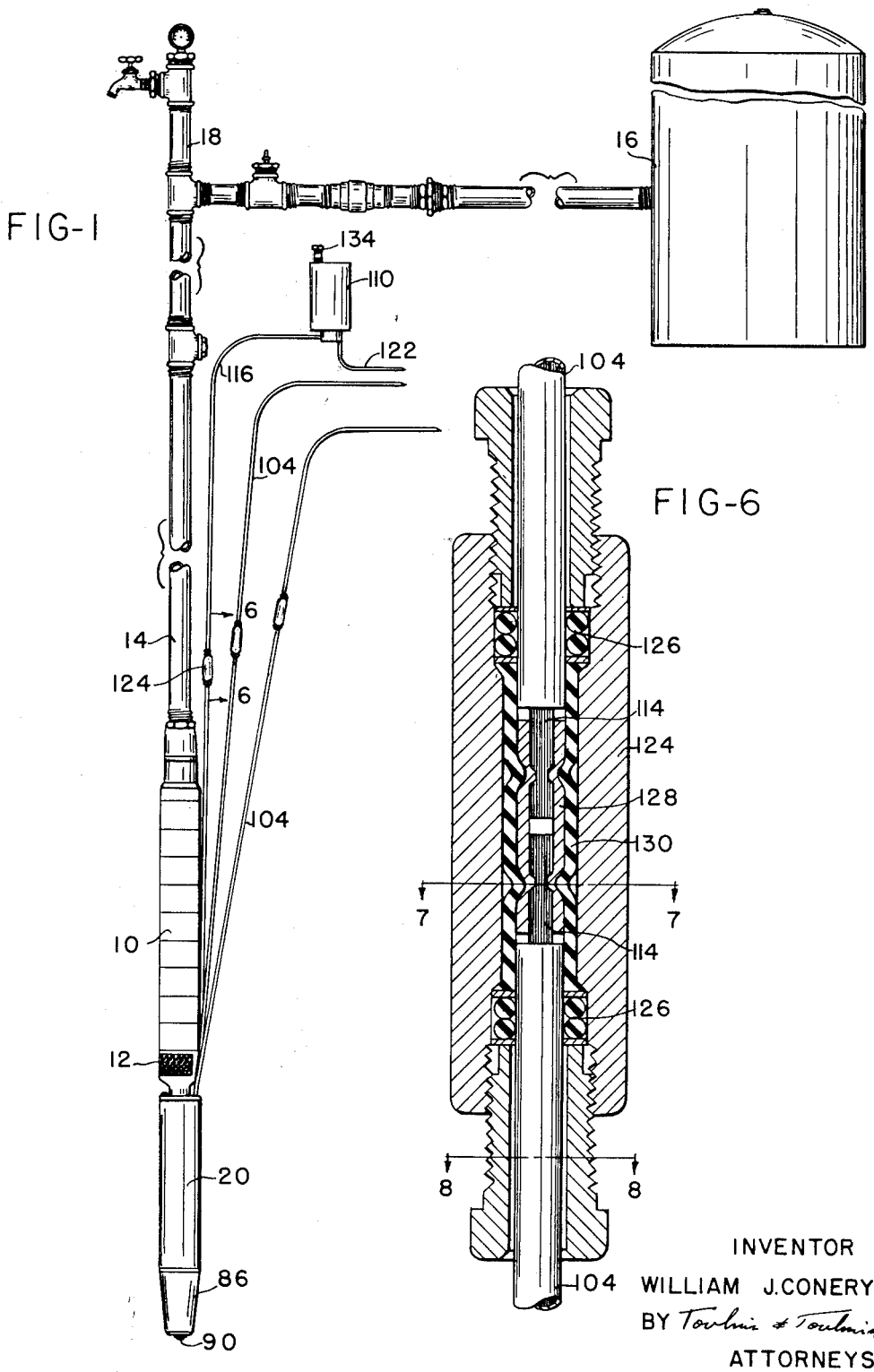
INVENTOR
WILLIAM J. CONERY
BY Toulmin & Toulmin
ATTORNEYS

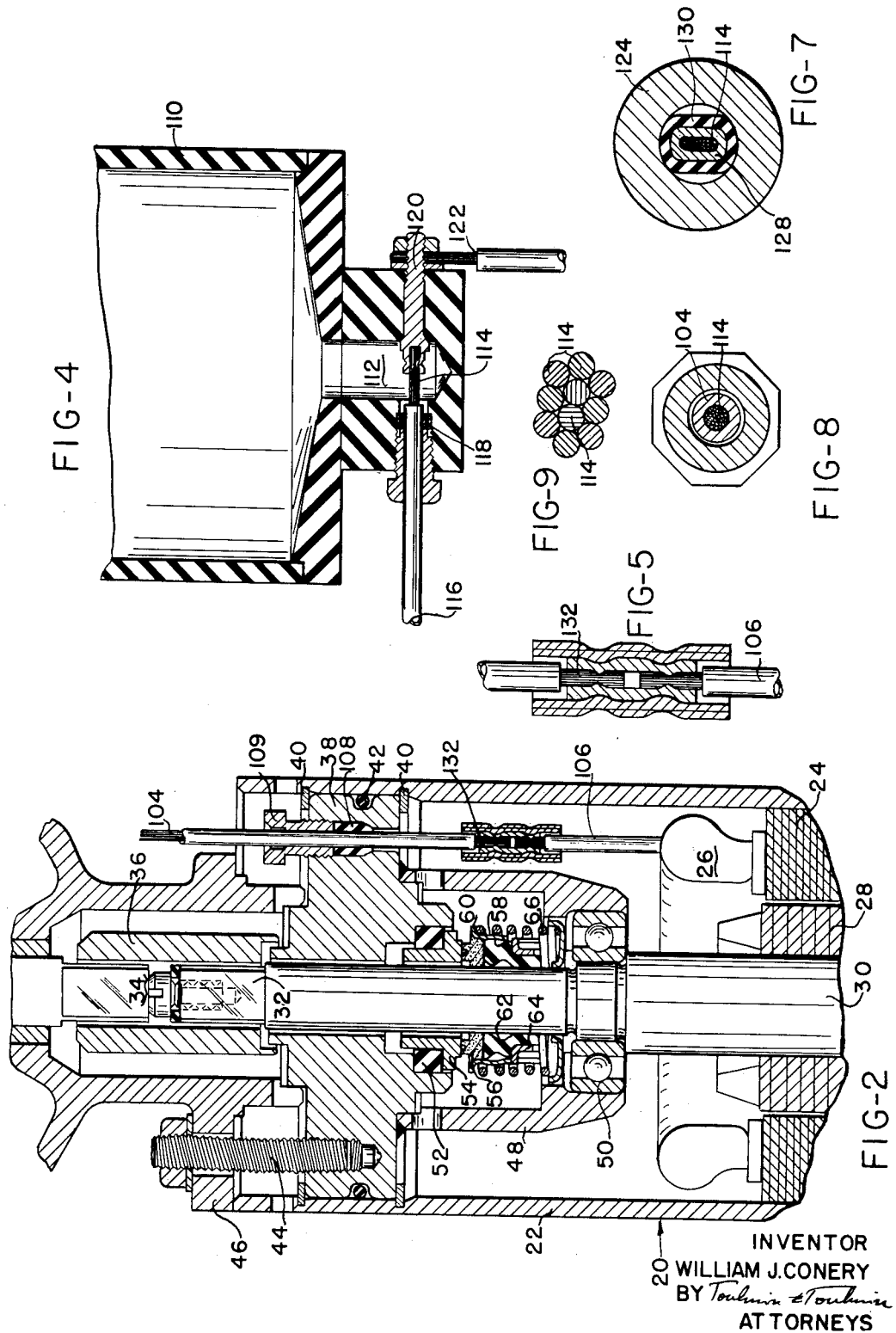

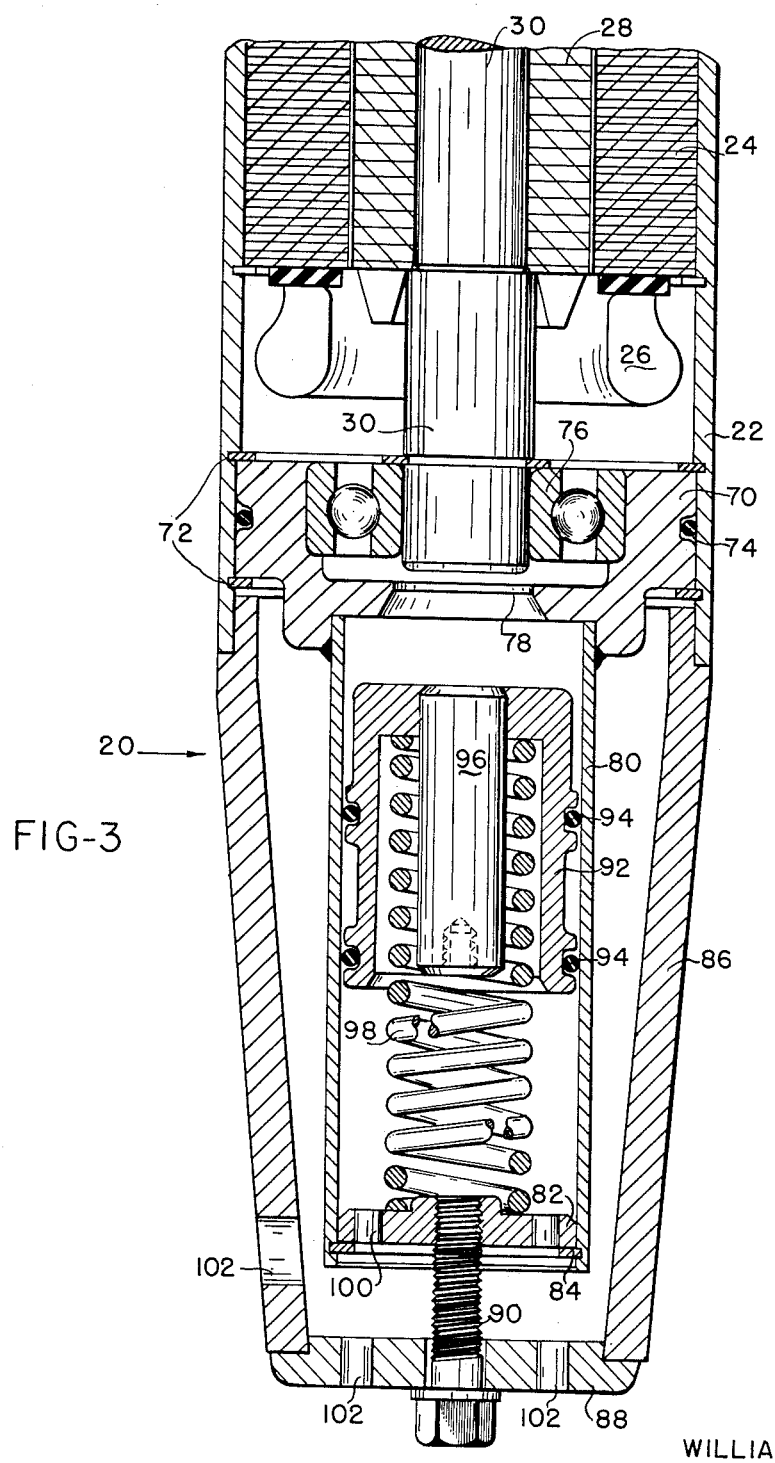

United States Patent Office 2,740,059
Patented Mar. 27, 1956

2,740,059
SUBMERSIBLE MOTOR

William J. Conery, Ashland, Ohio, assignor to The F. E. Myers & Bro. Co., Ashland, Ohio, a corporation of Ohio Application August 13, 1952, Serial No. 304,066

8 Claims. (Cl. 310—87)

This invention relates to submersible motors, particularly submersible electric motors for powering pumps and the like.

In connection with submersible pumps, such as water pumps, the electric drive motor is positioned underneath the pump at the bottom of the drop pipe in the well in order to eliminate a long drive shaft. Mechanically, such an arrangement is quite satisfactory for driving the pump, but, because the motor is positioned under the water and, therefore, under at least a certain amount of static head, it is necessary to seal the motor frame against the entrance of any moisture whatsoever.

Furthermore, it is not feasible frequently to pull the drop pipe, pump and motor from the well for servicing the motor and it is thus highly important to provide means for maintaining the motor lubricated at all times so that once installed in a well, it can remain therein for an indefinite period.

One successful arrangement for maintaining a submersible motor of the nature referred to, adequately lubricated at all times, and also sealed against the entrance of any moisture, is to completely fill the motor frame with lubricating and dielectric oil on which a predetermined pressure is maintained. Due to the fact that there is a rotating shaft that extends from the pump into the motor frame, there is always some leakage of oil from the motor frame, and which will eventually result in an insufficient supply of the lubricant unless oil is added to the motor frame.

Having the foregoing in mind, the primary object of this invention is the provision of an improved type submersible electric motor in which the drawbacks referred to above are eliminated.

A still further object is the provision of an arrangement for maintaining a submersed electric motor filled with lubricating and dielectric oil under pressure at all times.

A still further object is the provision of an arrangement for supplying lubricating oil under pressure to the interior of a submersed motor which will automatically compensate for the varying depths at which the motor might be located when installed.

Still another object is the provision of an arrangement for readily determining when a submersed electric motor of the nature referred to has a sufficient oil supply thereto to insure that the motor is completely filled.

A particular object of this invention is the provision of a novel means for supplying oil to an oil filled electric motor which eliminates the need for an extra oil supply conduit.

In brief, the objects of this invention are obtained by constructing an electric drive motor for a pump so that the motor is totally enclosed and fluid tight. Electric cables or supply lines lead into the motor and are sealed with the motor frame at the point or points where they enter the motor frame. At least one of these lead-in cables is a stranded conductor enclosed in a sleeve or tube of electric insulating material which is also characterized in not being affected by any oil that may be employed for filling the motor frame.

The stranded conductor or cable, referred to above, is led through an oil reservoir positioned above the motor, and the insulating tube surrounding the stranded cable is sealed along its entire length and has its one end opening into the inside of the motor frame and its other end opening into the inside of the oil reservoir. In this manner, by filling the reservoir with oil, a continuous supply of oil is available to the inside of the motor by the oil traveling along the stranded cable or wire and inside the insulating tube that surrounds the cable or wire.

The motor frame includes an expansible chamber which will permit expansion and contraction of the oil in the motor and which will also provide a predetermined quantity of oil available for filling the interior of the motor should the previously referred to supply be temporarily interrupted for any reason.

The several objects and advantages referred to above, as well as still other objects and advantages of this invention, will become more apparent upon reference to the following specification taken in connection with the accompanying drawings, in which:

Figure 1 is a more or less diagrammatic view of a pump and motor installation according to the invention;

Figure 2 is a sectional view through the upper end of the electric drive motor that is mounted on the bottom of the pump in Figure 1;

Figures 3 is a sectional view through the bottom part of the electric motor;

Figure 4 is a sectional view through the oil reservoir by means of which oil is supplied to the interior of the electric motor;

Figure 5 is a sectional view taken through a connector which connects one of the electric supply lines to one of the motor leads inside the housing or frame of the motor;

Figure 6 is a sectional view through a connector in one of the electric supply lines externally of the motor frame;

Figure 7 is a sectional view indicated by line 7—7 on Figure 6;

Figure 8 is a sectional view indicated by line 8—8 on Figure 6; and

Figure 9 is a fragmentary view showing a part of a typical stranded conductor illustrating how spaces exist between the individual wires of the conductor for passing oil along the said conductor.

Referring to the drawings somewhat more in detail, Figure 1 illustrates a submersible pump 10 which may comprise a centrifugal or axial flow pump and may further consist of a plurality of individual pump stages arranged in stacked relation and operable, when actuated, to draw fluid in through an inlet opening 12 and to discharge it upwardly into the drop pipe 14.

Drop pipe 14 may lead to a pressure tank 16 and may also have a branch 18 leading to service, all conventional in the art.

Secured to the bottom of the pump is an electric drive motor 20 illustrated in greater detail in the fragmentary sectional views of Figures 2 and 3.

In Figures 2 and 3 it will be seen that the motor 20 consists of an outer shell, housing, or frame 22 within which is rigidly mounted the magnetic frame or field 24 having the winding 26. The motor also includes a rotor 28 mounted on a shaft 30, and which shaft extends upwardly out through the top of the motor to terminate in a squared end 32 that is drivingly connected with the square lower end 34 of the pump shaft as by the connector 36 having a square hole therein.

The upper end of housing 22 has the closure member 38 mounted therein and retained in position by the snap rings 40. A resilient annular sealing ring 42 is positioned in a groove about the periphery of closure member 38 and provides a fluid tight seal between the closure member and the housing.

The studs 44 provide the means of securing the member 38, and, therefore, the motor assembly to the flange 46 on the bottom of pump 10.

Dependent from the underneath face of member 38 is a cup 48 apertured at its lower end for receiving the ball bearing 50 that supports shaft 30. The lower surface of member 38 also has a recess that receives the rubber-like ring 52 that embraces the central sleeve 54. The resilient ring 52 provides a fluid tight seal between member 38 and sleeve 54.

The lower face of sleeve 54 has a smoothly machined annular surface thereon that is engaged by the graphite ring 56 mounted in the upper end of the thin metal sleeve 58 that has an outwardly turned flange 60 at its upper end.

Sleeve 58 contains the resilient seal member 62 surrounding shaft 30 and held closely thereagainst by ring 64. A compression spring 66 presses upwardly on flange 60 and urges graphite ring 56 into sealing face-to-face engagement with sleeve 54.

In Figure 3 it will be seen that the lower end of motor housing 22 is also provided with a closure member 70 located and retained in position by the snap rings 72 and also having thereabout the resilient annular sealing ring 74. Closure member 70 is recessed to receive bearing 76 that supports the lower end of shaft 30 and the bearing recess communicates with the space below member 70 by aperture 78.

Secured to the lower face of closure member 70 about aperture 78 and extending downwardly is a cylinder 80 having a closure member 82 in the lower end retained therein by snap ring 84.

Abutting the lower end of housing member 22 is a substantially frustoconical member 86 having a lower end member 88 through which extends a screw 90 threaded into closure member 82. It will be evident that screw 90 serves to retain member 86 in position. Member 86 is principally a guard to prevent damage to the motor or cylinder 80 when the pumping assembly is inserted in a well casing.

Mounted within cylinder 80 is piston 92 having the spaced sealing rings 94 which effect a fluid tight seal between the piston and the cylinder. A central plunger 96 in the piston guides spring 98 which bottoms on closure member 82 at the bottom of the cylinder. Members 82, 86 and 88 are each apertured as at 100 and 102 and it will be evident, therefore, that the static pressure in the well will act upwardly on piston 92.

In Figures 1, 2, 4, 5 and 6 it will be seen that the electric power is supplied to the field 26 of the motor by connecting the electric wires 104 with the motor leads 106. Wires 104, or a cable containing all of the wires 104, is led through an opening in the upper closure member 38 and is sealed in the opening by the resilient sealing element 108 that is compressed by the packing gland 109.

At least one of the wires 104 leads to an oil reservoir 110 which is located above ground level. As will be seen, oil reservoir 110 has a chamber 112 at the bottom that is traversed by the wire 104 in Figure 4. Wire 104 comprises the stranded conductive part 114 and the insulating and fluid tight tube 116. Tube 116 is sealed in the wall of chamber 112 by the packing means 118 and the said tube is cut off within the said chamber. The end of the conductive portion 114 of the wire is fastened to a connector post 120 and to which the electric supply line 122 is connected externally of chamber 112.

Inasmuch as the wire 104 has a stranded conductive portion, there is space between and around the individual strands of the wire through which oil can pass. This fact is availed of for conducting the oil from the reservoir to the interior of the motor.

Should it be necessary to place a connector in the oil conducting wire 104 between the reservoir and the motor, this connector may take the form illustrated in Figure 6 wherein it will be seen that the insulating sleeve part of the adjacent ends of the two parts of the lead-in wire are sealed in a body 124 by the sealing means 126 while a metallic connector 128 electrically connects the stranded conductive portions 114. A rubber-like sleeve 130 surrounds connector 128 and the ends of the insulating tubes of the lead-in wires and a fluid connection is thus made which will conduct oil from the upper lead-in wire to the lower lead-in wire.

Within the motor housing the insulating tube on the wire is cut back as at 132 in Figure 2 so that the oil that is seeping down the lead-in wire will flow directly into the inside of the motor.

Inasmuch as the oil reservoir 110 is located well above the liquid level in the well, a pressure will be built up on the oil in the motor which will urge piston 92 downwardly against spring 98. The piston will thus be in a position to be able to displace a reserve quantity of oil to the motor should the supply from the reservoir fail for any reason, and likewise the resilience of the piston will permit expansion and contraction of the oil within the motor.

The reservoir 110 is preferably provided with a filler cap 134 so that oil can be supplied thereto as may be necessary.

The oil that is supplied to reservoir 110 is preferably a good lubricating oil, also having the qualities of high dielectric strength and thus serves not only as a lubricant but as an insulating medium within the motor.

In actual operation, it has been found that even the most effective sealing arrangement around shaft 30 between the motor and pump will permit the escape of one or two drops of oil per hour and it will thus be evident that a fairly small amount of oil in reservoir 110 will provide for adequate sealing and lubrication of the motor for a long time once the motor has been filled. At the same time it will be evident that the lack of any means for adding to the oil supply within the motor, such as is provided by my arrangement of the elevated reservoir, would inevitably lead to an insufficient supply of oil within the motor to maintain it lubricated and to exclude all water therefrom.

The motor unit, according to the present invention, can be filled with oil before leaving the factory and this will insure absolutely proper conditions when the motor is installed in the well, thereby giving the greatest possible assurance of a long operating life.

The arrangement of the reservoir, at or above ground level, is also important because no matter how deeply in the well the motor is placed, there will always be a greater head on the oil within the motor than there is a head of water outside the motor, and the motor is, therefore, positively closed against the ingress of any moisture whatsoever.

It will be understood that this invention is susceptible to modification in order to adapt it to different usages and conditions, and, accordingly, it is desired to comprehend such modifications within this invention as may fall within the scope of the appended claims.

I claim:

1. In a submersible motor; a fluid tight housing enclosing the stator and rotor of the motor, lead-in wire means sealingly passing into said housing, said lead-in wire means comprising a fluid-tight insulating sleeve means and conductor means fitting closely therein but not completely filling said sleeve means, means for supplying a dielectric fluid to the interior of said housing through said lead-in wire means, said motor housing including an aperture in the bottom wall, a cylinder depending from the bottom wall and secured thereto about said aperture, a piston sealingly fitting in the cylinder, a guard member extending downwardly from the bottom of the housing about the cylinder, and said guard and cylinder being apertured so the bottom of the piston is exposed to the medium surrounding the motor, there being a spring continuously urging the piston upwardly in the cylinder.

2. In combination, a submersible pump having a drop pipe extending upwardly therefrom for the delivery of water from the pump, a drive motor mounted on the bottom of said pump and having an output shaft drivingly connected with the driven element of the pump, said motor comprising a fluid tight housing, a fluid tight seal in the housing about the output shaft of the motor, lead-in wires extending into the housing of the motor, each comprising a stranded conductor having space between individual strands and a fluid tight sleeve of insulation fitting closely thereabout, each lead-in wire being sealed to the housing where it passes therein, the said lead-in wires being connected with the motor leads inside the housing, a fluid reservoir in an elevated position relative to the motor, at least one of said lead-in wires extending into said fluid reservoir, and means sealing the insulating sleeve where the said lead-in wires enter the reservoir whereby a dielectric oil supplied to said reservoir will flow by gravity down the said lead-in wire about the conductor and inside said sleeve to the inside of said motor housing.

3. In combination, a submersible pump having drop pipe extending upwardly therefrom for the delivery of water from the pump, a drive motor mounted on the bottom of said pump and having an output shaft drivingly connected with the driven element of the pump, said motor comprising a fluid tight housing, a fluid tight seal in the housing about the output shaft of the motor, lead-in wires extending into the housing of the motor, each comprising a stranded conductor, having space between individual strands and a fluid tight sleeve of insulation fitting closely thereabout, each lead-in wire being sealed to the housing where it passes therein, the said lead-in wires being connected with the motor leads inside the housing, a fluid reservoir in an elevated position relative to the motor, at least one of said lead-in wires extending into said fluid reservoir, and means sealing the insulating sleeve where the said lead-in wire enters the reservoir whereby a dielectric oil supplied to said reservoir will flow by gravity down the said lead-in wire about the conductor inside the sleeve to the inside of said motor housing, said motor housing including expansible chamber means resiliently urged towards collapsed position and opening to the inside of the housing for receiving a predetermined quantity of the said dielectric oil and retaining it under pressure.

4. In a device for supplying oil to the inside of an electrical conductor; a reservoir, means for sealingly admitting an insulated conductor into said reservoir at one point, and means for effecting electrical connection with the conductive part of said conductor, and the insulation on said conductor terminating inside the reservoir short of said electrical connecting means to expose said conductor within said reservoir whereby fluid in the reservoir can constantly enter the said insulation and pass therein along the said conductor.

5. In a device for supplying fluid to a conductor in the manner described, said conductor comprising; a stranded conductive portion and an insulating sleeve fitting closely thereabout, a reservoir, means forming a chamber at the bottom of the reservoir, means for sealingly admitting said conductor at one side of said chamber, means for insulatingly and sealingly receiving an electrical connector into said chamber at another point, said sleeve terminating within the chamber to expose the stranded conductor therein and said conductive portion being connected with said connector in said chamber whereby fluid in the reservoir can constantly enter the said insulating sleeve and pass therein along the said stranded conductor.

6. In a submersible motor; a fluid tight housing enclosing the stator and rotor of the motor, lead-in wire means sealingly passing into said housing, said lead-in means comprising a fluid tight insulating sleeve means closely fitting a stranded conductor having channels therealong defined by surfaces of the strands, and means for supplying a dielectric fluid to the interior of said housing along said conductor.

7. In a submersible motor, a fluid tight housing enclosing the stator and rotor of the motor, a lead-in wire sealingly passing into said housing comprising a stranded conductor having channels therealong defined by the surfaces of the strands and insulation fitting closely thereabout, the insulation forming a fluid tight tube about the conductor, the end of the tube outside the motor opening into a fluid reservoir, and the end of the tube in the motor being cut back to expose said conductor whereby fluid from the reservoir will pass along the conductor within the tube into the motor housing.

8. In a submersible motor, a fluid tight housing enclosing the stator and rotor of the motor, a lead-in wire passing into the housing comprising a stranded conductor having channels therealong defined by the surfaces of the strands, an insulating tube fitting closely thereabout, said tube having one end opening into the interior of the housing and its other end outside the housing and being sealed to the housing where it passes therethrough, and a fluid reservoir into which the said other end of the tube opens whereby fluid will flow by gravity from said housing along said conductor within said tube into said motor housing.

References Cited in the file of this patent

UNITED STATES PATENTS

| | | |
|---|---|---|
| 1,718,817 | Greene | June 25, 1929 |
| 1,737,650 | Emanueli | Dec. 3, 1929 |
| 1,957,995 | Emanueli | May 8, 1934 |
| 1,979,150 | Emanueli | Oct. 30, 1934 |
| 1,988,279 | Kirch | Jan. 15, 1935 |
| 2,002,910 | Mendenhall et al. | May 28, 1935 |
| 2,002,912 | Mendenhall et al. | May 28, 1935 |
| 2,233,890 | Hoover | Mar. 4, 1941 |
| 2,301,340 | Spengler | Nov. 10, 1942 |